United States Patent [19]

Gabriel

[11] Patent Number: 5,144,322

[45] Date of Patent: Sep. 1, 1992

[54] LARGE-APERTURE SPARSE ARRAY DETECTOR SYSTEM FOR MULTIPLE EMITTER LOCATION

[75] Inventor: William F. Gabriel, Annadale, Va.

[73] Assignee: The United States of America as represented by the Secretary of the Navy, Washington, D.C.

[21] Appl. No.: 275,873

[22] Filed: Nov. 25, 1988

[51] Int. Cl.⁵ .......................... G01S 3/16; G01S 3/28
[52] U.S. Cl. .................................... 342/383; 342/373
[58] Field of Search ............... 342/372, 373, 380, 383, 342/384

[56] References Cited

U.S. PATENT DOCUMENTS

| | | |
|---|---|---|
| 4,313,116 | 1/1982 | Powell et al. |
| 4,495,502 | 1/1985 | Masak ........................... 342/380 |
| 4,516,126 | 5/1985 | Masak ........................... 342/383 |
| 4,555,706 | 11/1985 | Haupt ........................... 343/380 |
| 4,692,768 | 9/1987 | Becavin ........................ 342/373 |

Primary Examiner—Theodore M. Blum
Attorney, Agent, or Firm—Thomas E. McDonnell; Edward F. Miles

[57] ABSTRACT

A detector beamformer array system having a sparse array and a reference array. The reference array is adapted, according to known principles, to have an output response with one main lobe significantly larger than all other side lobes, and with a substantially flat response. Signals received by both arrays are cross-correlated with one another, and only signals sufficiently correlated are annunciated. The resulting adaptive array system has a resolution even better than that of the sparse array's aperture, and with directional sector selectivity corresponding to the angular width of the reference array's mainlobe, providing a system having high resolution and directional selectivity, but with far fewer sensors than with filled arrays used for this purpose.

5 Claims, 3 Drawing Sheets

LARGE-APERTURE SPARSE ARRAY DETECTOR SYSTEM FOR MULTIPLE EMITTER LOCATION

The invention pertains to beamformer array systems, e.g. antennas or sonar sensors, and in particular to large aperture sparse array systems used to discriminate between signal emitters (targets) disposed in different locations.

BACKGROUND OF THE INVENTION

A fundamental problem in the design in any beamformer array is the trade off in array performance versus total array hardware. The larger an array's aperture, the greater the array's resolution. The more fully filled the aperture is with sensors, the more precise is the array's response. (An aperture is fully filled if it has sensors located at intervals of one-half the wavelength of the midband frequency for which the aperture is designed.) However, each sensor in the array and its associated processing circuitry constitutes a considerable amount of hardware. The greater the number of sensors in an array, the greater the hardware in the array, and the greater the system costs. For practical systems, the cost per sensor leg can be great, and decreasing the total number of legs required to achieve the same result can drastically reduce the cost of a system. Sparse (not fully filled) arrays do not produce unique detection beams, but rather tend to produce grating lobes that replicate throughout 180° of look angles. Although such an array can detect the presence of a signal emitter, because of the replication of grating lobes it cannot readily determine from which direction the emitter is signaling, making target estimation (location) impossible. These problems are touched upon in the inventors's paper, "Large-Aperture Sparse Array Antenna Systems of Moderate Bandwidth for Multiple Emitter Location", Memorandum Report of the U.S. Naval Research Laboratory No. 6109, the substance of which is incorporated herein by reference.

SUMMARY OF THE INVENTION

Accordingly, an object of the invention is to permit target estimation using less hardware.

Another object is to permit a sparse array to be used for this purpose, in particular to use sparse arrays to estimate not only the presence of an emitter, but also the location of the emitter.

In accordance with these and other objects made apparent hereinafter, the invention is a sensor array system having a sparse array of sensors, a reference array of sensors, and means for shaping the response of the reference array. The reference array and the shaping means cooperate to cause the response of the reference array to comprise one main lobe and a plurality of sidelobes, the mainlobe being substantially larger than the sidelobes and having a substantially flat magnitude over a preselected continuous range of look angles. The system also has a means for forming a cross-correlation of signals detected by the sparse array and the reference array. By discarding received signals that are insufficiently cross-correlated, the system can pass only signals received by the sparse array from the range of look angles (the "assigned sector") correspondig to the main lobe of the reference array. This compliments the high resolution of the sparse array with directional sensitivity, permitting one to do target estimation with considerably less hardware than with fully filled apertures conventionally used for this purpose.

The invention is more fully understood from the following detailed description of preferred embodiments, it being understood, however, that the invention is capable of extended application beyond precise details of the preferred embodiments. Changes and modifications can be made that do not affect the sprit of the invention, nor exceed its scope, as expressed in the appended claims. Accordingly, the invention is described with particular reference to be accompanying drawings, wherein:

DETAILED DESCRIPTION

Figure 1:
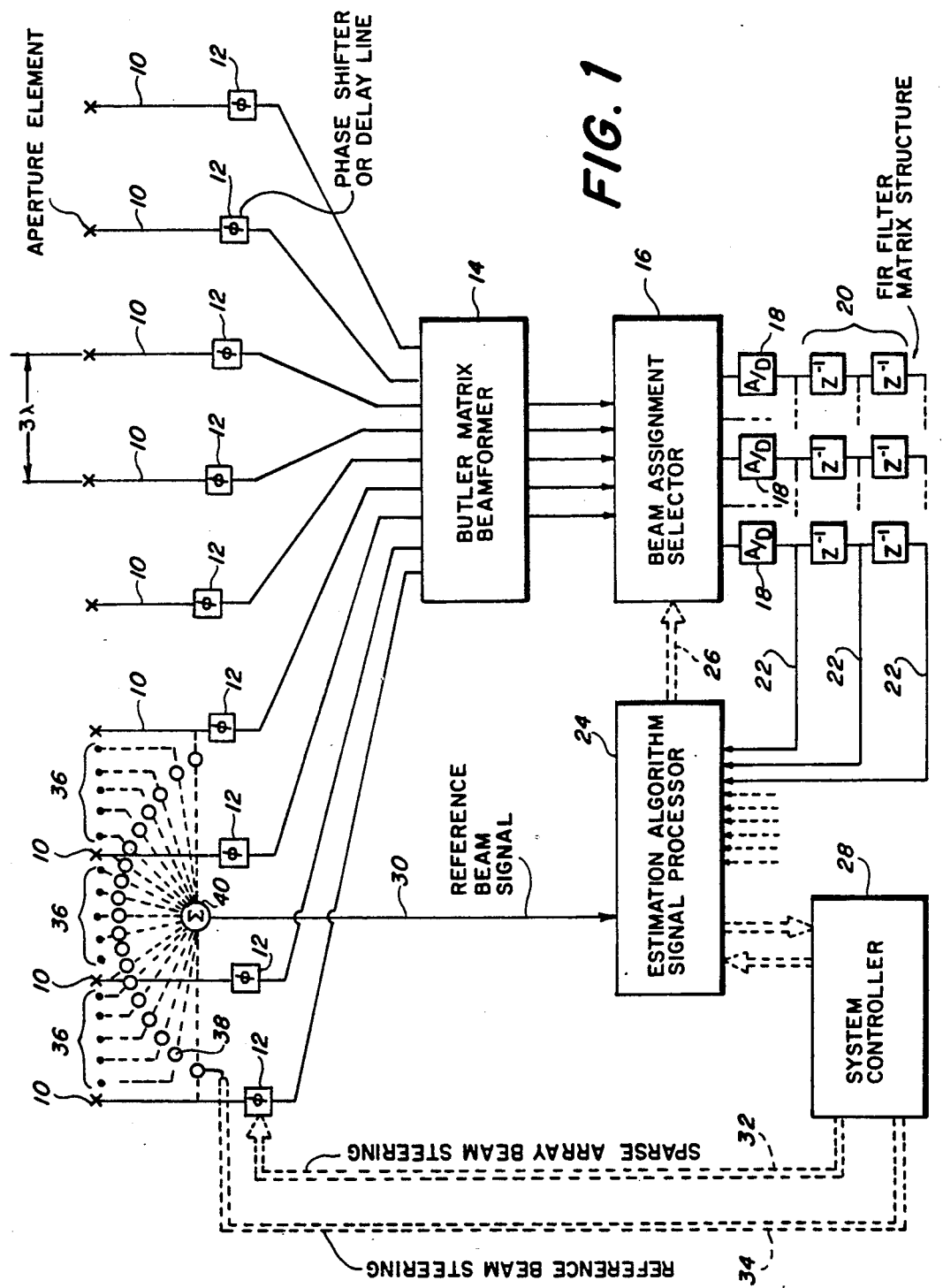
FIG. 1 is a schematic diagram of the sensor system.

With reference to the drawing figures, and in particular FIG. 1, a sensor array is shown in accordance with the invention. Although the following discussion contemplates an antenna array, the invention is of a broader scope than the perferred embodiment, and applies to any beamformer array. The system has a plurality of conventional signal sensors 10, sensors 10 together forming a detector array, each sensor 10 forming a separate leg of the beamformer array, each leg containing also a conventional phase shifter or delay line 12, the purpose of which is to steer the look angle of the array in accordance with well known and conventional principles. Sensors 10 are spaced far apart compared to the midband wavelength for which the array is designed, in the preferred embodiment approximately three times the midband wavelength. Because of this distant spacing, the array formed by element 10 is a sparse array. The outputs of sensors 10, appropriately phased by elements 12, are fed into beamformer 14, which is preferably a Butler matrix beamformer, but can be any conventional kind. The output of the beamformer is fed into beam assignment selector 16, the purpose of which is to selectively eliminate signals from particular beams associated with individual sensors 10, for reasons discussed in conjunction with FIGS. 2 and 3, below. Analog to digital converters 18 convert the output of assignment selector 16 to digital form for convenience of signal processing. The digitalized circuits are fed into filter matrix 20,,the purpose of which is to perform a discrete fourier transform on the digitalized outputs of converters 18 so as to convert the data from the time to the frequency domain, in accordance with conventional principles. Not only does this aid signal processing, it expands the bandwidth of the system. The output of the network 22 is fed into signal processer 24, for processing in accordance with the requirements of the estimator system, more about which below. The beamformer array has a system controller 28 which directs via line 32 the particular phase shifts or delays imposed by elements 12, selectively steering the array.

In addition to sparse array elements 10, the system has a reference array with a plurality of sensors 36. The array formed by sensors 36 can, like the array formed from elements 10, be selectively steered by system controller 28 via line 34 and variable phase shifter or delay lines 38. The outputs of elements 36 are formed into a unified beam by beamformer 40, the output of which is fed directly into signal processor 24. Signal processor 24 contains a computer processor for cross-correlating signals received by the sparse and reference arrays, and a discriminator for discarding signals that correlate insufficiently, for reasons discussed below.

Figure 2:
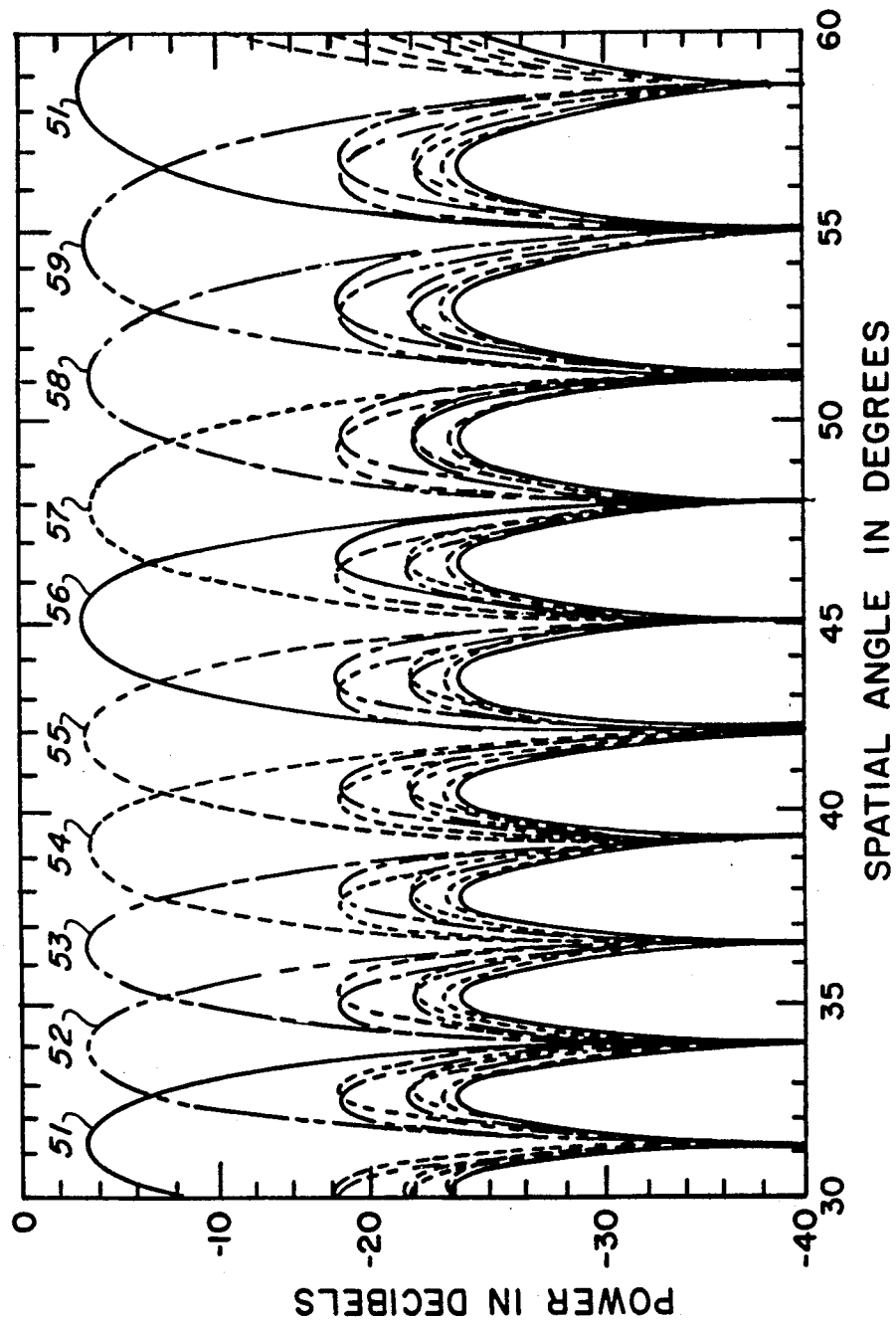
FIG. 2 illustrates the response of a sparse array.

With particular reference to FIG. 2, the output of the sparse array of elements 10 is illustrated. The data of FIG. 2 resulted from a computer simulation of a nine sensor sparse array, the sensors equally spaced three midband wavelengths apart, and the entire array steered towards a simulated signal emitter located at a look angle of 42°. As seen in FIG. 2, the response of the array is comprised of a cluster of individual beams 51 through 59 of roughly the same gain. This clustering results from the distant spacing of sensors 10 and the Butler matrix beamformer. Although FIG. 2 illustrates only look angles from 30° to 60° this pattern replicates itself throughout 180°, as is discussed above. Thus the wide sensor spacing inherent in a sparse array results in a system that is directionally insensitive. A source emitter in the direction of peak 57 would be indistinguishable from a source emitter in the direction of other grating lobes associated with beam 57.

Figure 3:
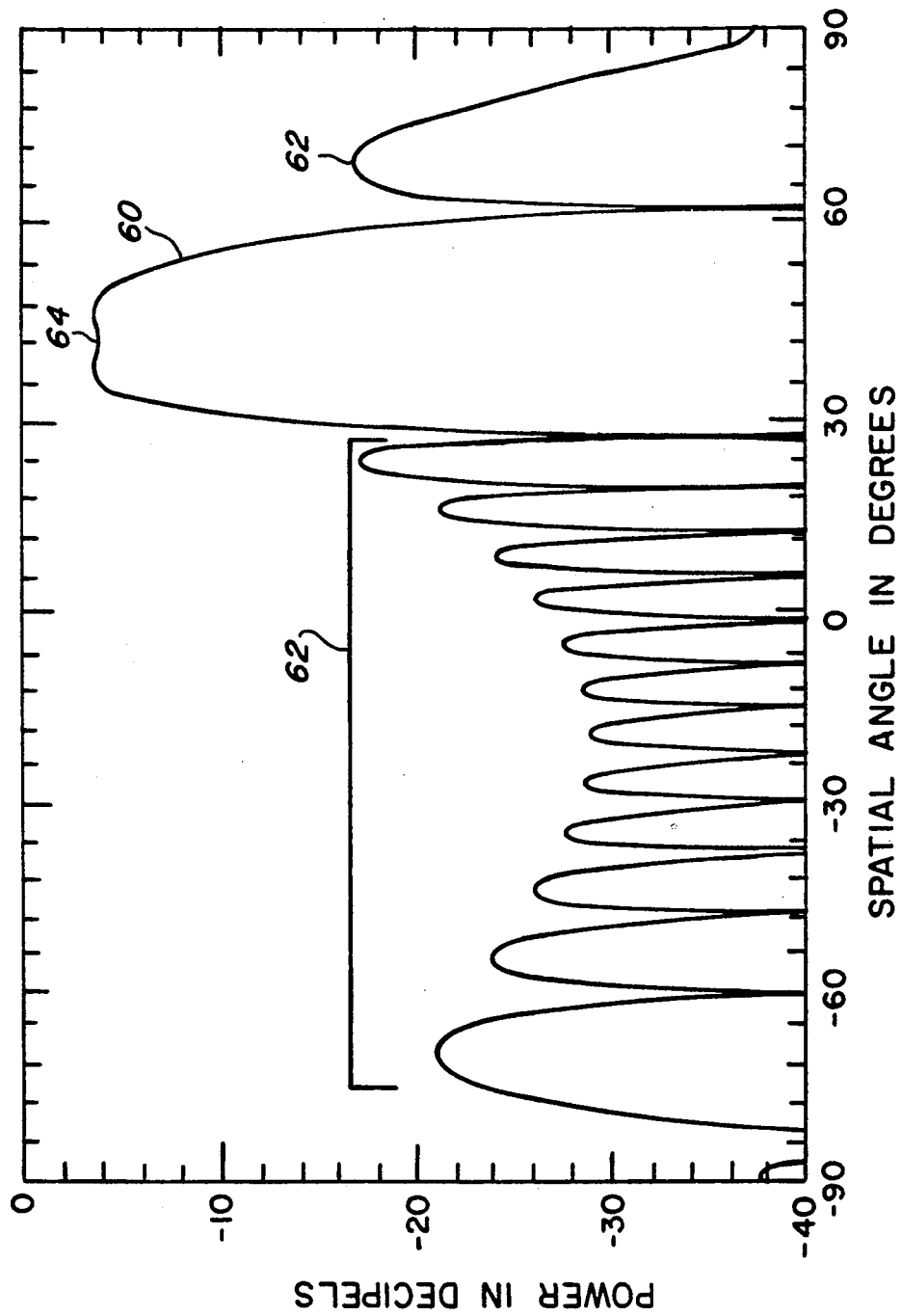
FIG. 3 illustrates a reference beam in accordance with the invention.

With particular reference to FIG. 3, the output beams of the reference array are illustrated. The particular data presented in FIG. 3 are from a computer simulation of a 19 element filled linear array used in conjunction with a the sparse array whose simulation generated the data presented in FIG. 2. (The phase center of the reference array is located distant from that of the sparse array to render spatial estimation more robust. In this simulation, the phase centers of the two arrays were located 7.5 midband wavelengths apart.) Unlike sparse arrays, the output beam of the reference array formed by elements 36 can be weighted in accordance with known principles to have a response comprising one main lobe 60, and a plurality of much smaller sidelobes 62. The weighting of the outputs of sensors 36 can also cause mainlobe 60 to have a relatively flat portion 64.

Because the aperture of the refernce array is far smaller than that of the sparse array, beams formed from the reference array will not have the same resolution as those from the sparse array. But because of the narrower spacing of sensors 36, the reference array's beams, unlike those of the sparse array, can be shaped to approximate optimal spacial response: flat and large through a continuous range of look angles of interest, and small elsewhere. (The reference array must be fully filled; otherwise, it is believed, one cannot suppress the sidelobes' magnitude sufficiently.) By cross-correlating the outputs of each array, and automatically discarding recieved signals that do not correlate sufficiently, one effectively passes only the signals received by the sparse array from the sector to which the reference array is directed. In this manner, one achieves the resolution of the sparse array's aperture, as well as directional selectivity, but by using far fewer sensors and associated processing hardware than was hitherto necessary to achieve these results, reducing the cost of the array system enormously.

Please note that one could introduce a degree of directrional selectivety to the sparse array by commanding beam assignment selector 16 to null selected sensors 10 whose outputs contrubute to look angles not of interest. (For expamle, nulling out the sensors 10 that produce beams 53, 54, 55 of FIG. 2 effectively blinds the sparse array between about 36° and 42°.) This approach, however, provides only for rough controllability of look angle, whereas the invention provides directional controlability of a precision limited only by a designer's ability to shape the reference beam's mainlobe. Standrd techniques of lobe shaping are well known in the art, and the approach of the invention is clearly perferable, although the selective nulling of array sensors can be used in conjunction with the invention to supplement the control the system's directional response.

The invention has been described to what is considered to be the most practical and preferred embodiment. It is recognized, however, that obvious modifications may occur to those skilled in the art. Accordingly, the scope of the invention is to be discerned solely by the reference to the appended claims, wherein:

What is claimed and desired to be secured by Letter Patent of the United States is:

1. A detector array system comprising:
   a sparse array of sensors;
   a reference array of sensors, said reference array being fully-filled;
   means for shaping the response of said reference array, said reference array and said means for shaping adapted to cooperate to cause said response of said reference array to comprise one main lobe and a plurality of sidelobes, said mainlobe being substantially larger than said sidelobes, said mainlobe having a substantially flat magnitude over a preselected continuous range of look angles; and
   means for forming a cross-correlation of signals detected by said sparse array and said reference array.

2. An antenna system for detecting electro-magnetic signals within a preselected frequency band, said system comprising:
   a sparse array of sensors;
   a fully-filled reference array of sensors, the aperture of said sparse array being substantially larger than the aperture of said reference array;
   correlation means for cross-correlating signals received by both said sparse array and said reference array;
   discrimination means for rejecting, responsive to said correlatin means, ones of said signals that do not correlate by a preselected amount.

3. The antenna system of claim 2, wherein said sensors of said sparse array are each spaced from one another by a distance of at least three midband wavelengths of said system.

4. A method of detecting signals, said method using a detector array system comprising:
   a sparse array of sensors;
   a reference array of sensors, said reference array being fully-filled;
   said method comprising steps for:
   shaping the response of said reference array to comprise one main lobe and a plurality of sidelobes, said mainlobe being substantially larger than said sidelobes, said mainlobe having a substantially flat magnitude over a preselected continuous range of look angles;
   forming a cross-correlation of signals detected by said sparse array and said reference array; and
   rejecting ones of said signals that do not correlate by a preselected amount.

5. A detector array system comprising:
   a sparse array of sensors;
   a reference array of sensors, said reference array being fully-filled;

means for shaping the response of said reference array, said reference array and said means for shaping adapted to cooperate to cause said response of said reference array to comprise one main lobe and a plurality of sidelobes, said mainlobe being substantially larger than said sidelobes; and means for forming a cross-correlation of signals detected by said sparse array and said reference array.

* * * * *